United States Patent [19]

Grooms

[11] Patent Number: 4,917,143
[45] Date of Patent: Apr. 17, 1990

[54] INLET VACUUM VALVE WITH QUICK-RELEASE MOUNTING APPARATUS FOR UNIT CONTROLLER

[75] Inventor: John M. Grooms, Rochester, Ind.

[73] Assignee: Burton Mechanical Contractors, Inc., Rochester, Ind.

[21] Appl. No.: 405,386

[22] Filed: Sep. 7, 1989

[51] Int. Cl.⁴ .................. F16L 3/00; B65G 53/34
[52] U.S. Cl. .................. 137/343; 137/236.1; 137/315; 137/907; 251/367; 406/192
[58] Field of Search .................. 251/367, 291, 61.5, 251/28; 137/343, 315, 907, 236.1; 406/192

[56] References Cited

U.S. PATENT DOCUMENTS

| | | | |
|---|---|---|---|
| 3,774,637 | 11/1973 | Weber et al. | 137/625.6 |
| 4,171,053 | 10/1979 | Cleaver et al. | 406/192 |
| 4,231,389 | 11/1980 | Still et al. | 251/291 |
| 4,373,838 | 2/1983 | Foreman et al. | 137/236.1 |
| 4,691,731 | 9/1987 | Grooms et al. | 137/236.1 |

Primary Examiner—A. Michael Chambers
Attorney, Agent, or Firm—Jones, Day, Reavis & Pogue

[57] ABSTRACT

A quick-release mounting apparatus for securing a unit controller assembly to the upper housing of an inlet vacuum valve for a vacuum sewerage system, for facilitating quick removal of the unit controller assembly, is disclosed. A base member, having slot-like shoulder portions on each respective side, is heat-staked to the top surface of the upper housing of the inlet vacuum valve. A quick-release mounting key member is then inserted into each of the respective shoulder slot openings on top of the mounting feet. The mounting key has respective keyed apertures to enable it to fit around certain portions of the unit controller. The mounting key has a centrally disposed spacer portion and a pair of elongated tine members, which are tapered and rounded at their respective ends. The mounting key is then pushed into the slot-like openings to secure a tight press fit of the mounting key, the mounting feet of the unit controlled assembly, within the slot-like openings of mounting base member. An alternative embodiment of the present invention allows the quick-release mounting key to have one of the tines to be longer than the other, at the end of which there is positioned an integral hook-shaped end fastener which fastens over the end of one of the mounting feet of the unit controller assembly. The quick-release mounting key has a handle portion at one end for easy insertion and removal of the mounting key from the base member.

8 Claims, 4 Drawing Sheets

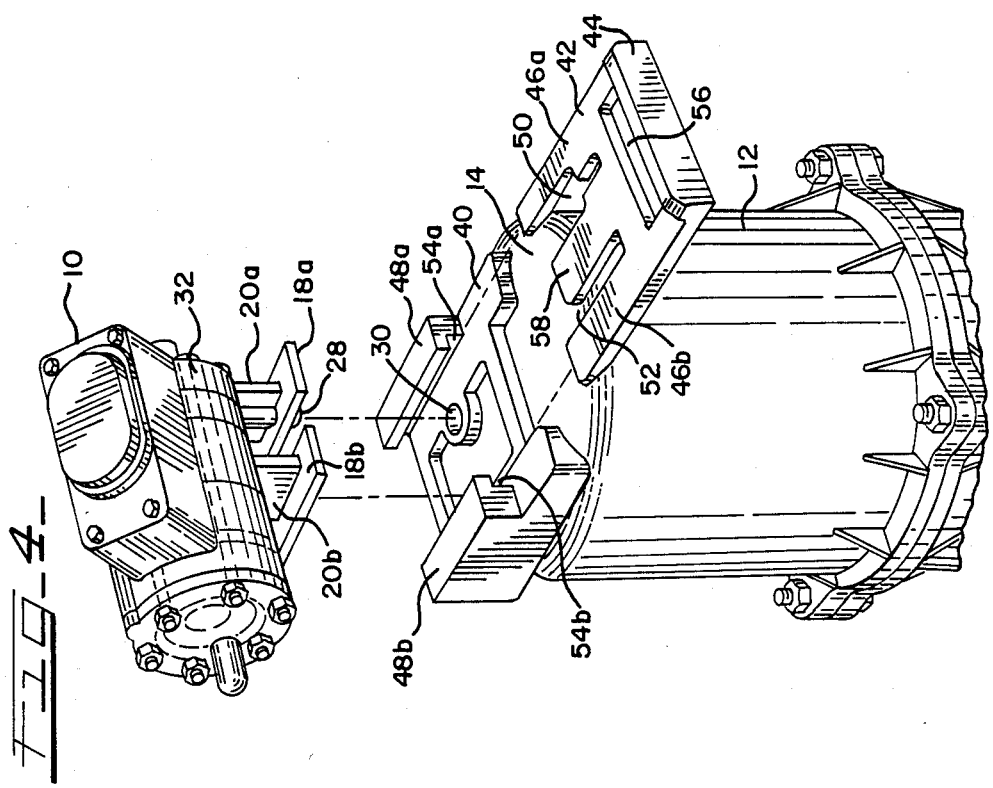
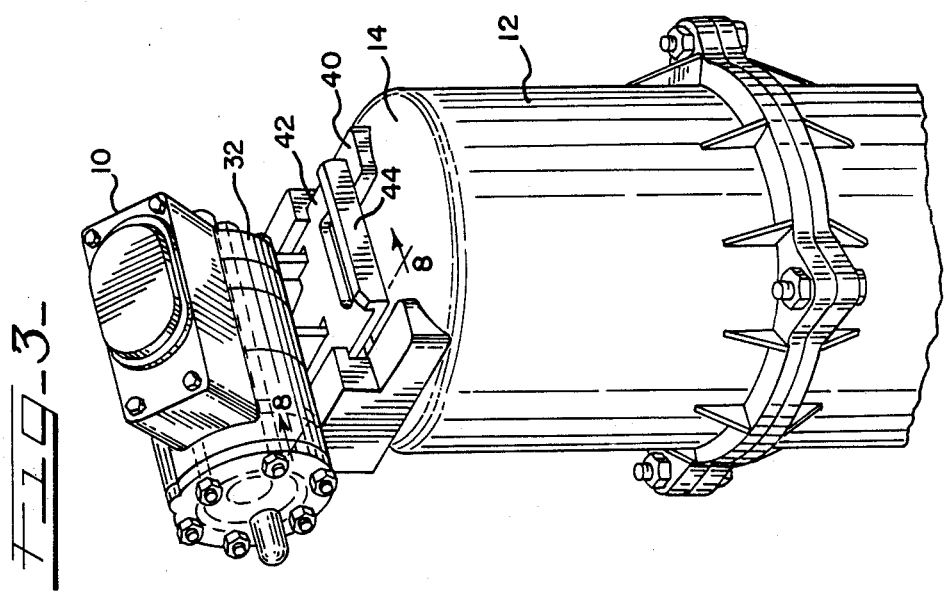

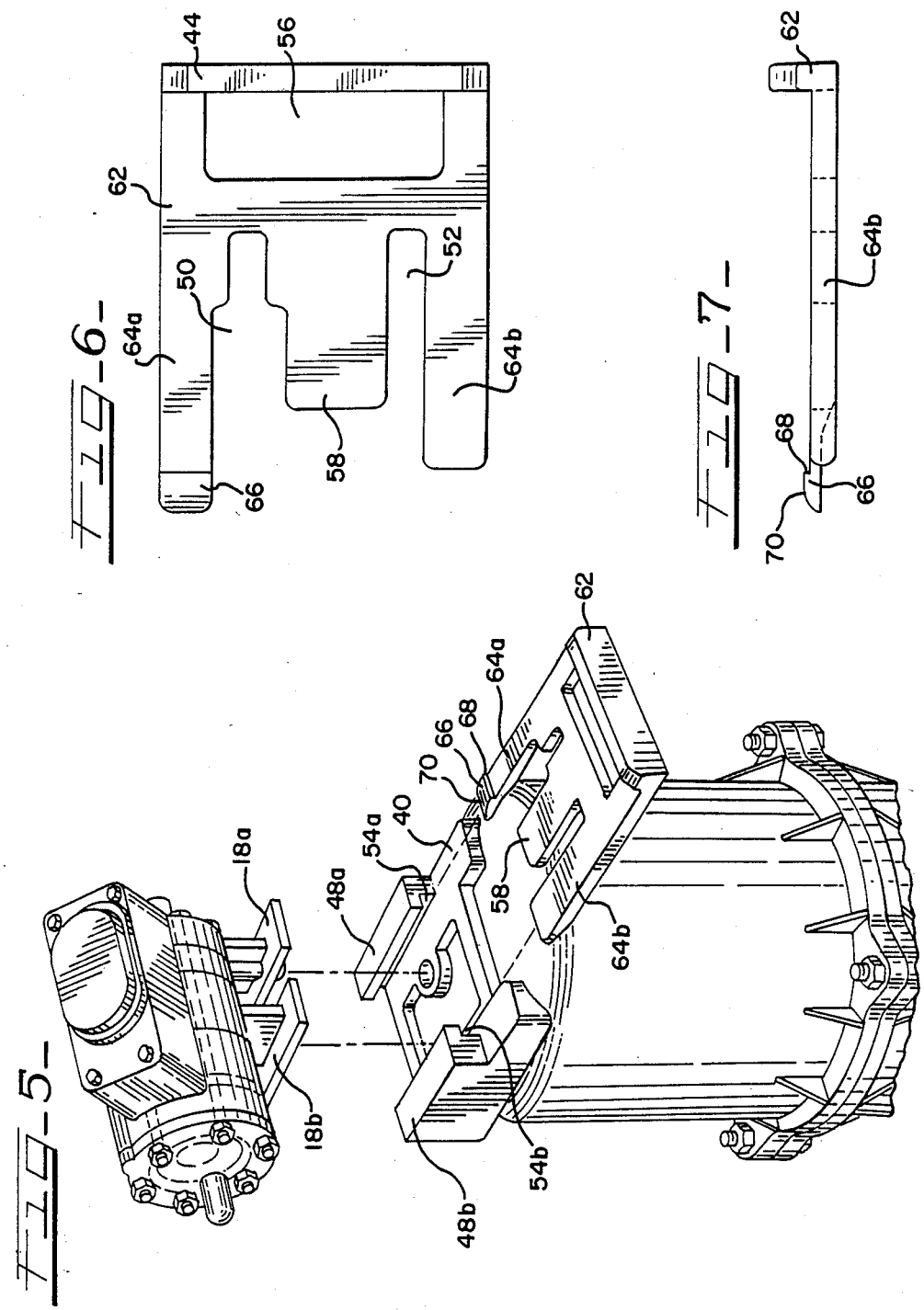

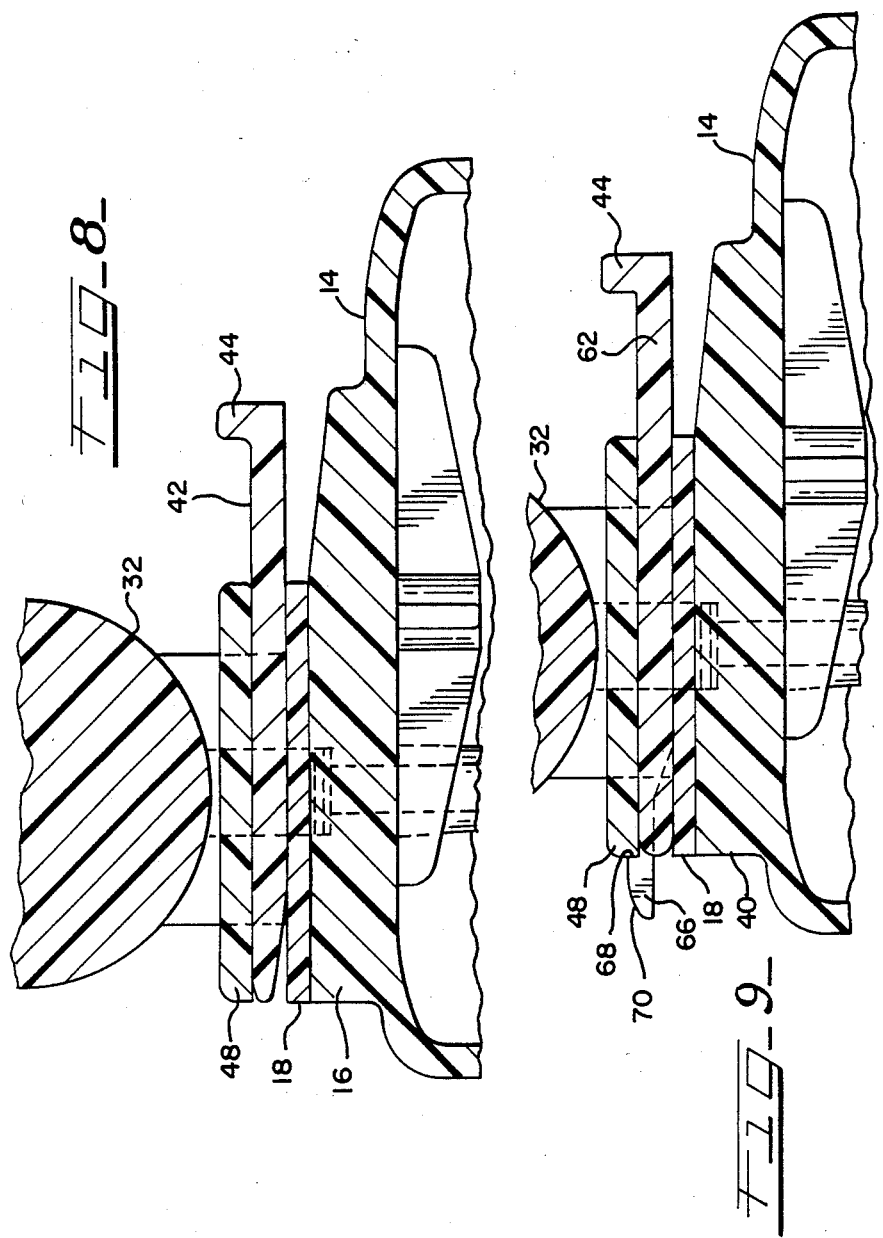

INLET VACUUM VALVE WITH QUICK-RELEASE MOUNTING APPARATUS FOR UNIT CONTROLLER

BACKGROUND OF THE INVENTION

This invention relates to an inlet vacuum valve having a unit controller for a vacuum sewerage system and, more particularly to, a mounting apparatus which facilitates easy mounting and removal of the unit controller of an inlet vacuum valve for a vacuum sewerage system.

Vacuum-operated sewerage systems of the prior art design and construction employ vacuum collection stations connected to a pipe network of sewer lines linked to remote a sewerage inlet point which serves one or more houses. Each inlet point has a vacuum operated valve which provides for intermittent admission of the accumulated sewage into the vacuum pipe network. A unit controller which operates the inlet vacuum valve in a predetermined pattern. The inlet vacuum valve acts as an interface between the vacuum sewerage system and the conventional gravity sewer lines associated with a house. The inlet vacuum valve and unit controller are contained in a below-grade pit where the vacuum and gravity connections are facilitated and where maintenance of the inlet vacuum valve and unit controller occurs. The general structure and method of operation of the inlet vacuum valve and unit controller are described in U.S. Pat. No. 4,171,853 (Cleaver, et al.); U. S. Pat. No. 4,373,838 (Foreman et al.) and U.S. Pat. No. 4,691,731. (Grooms et al.).

The controller unit for each of the inlet vacuum valves is a relatively sophisticated and complicated piece of vacuum-operated equipment. The unit controller is the piece of equipment which cycles the inlet vacuum valve to open at a predetermined time and pattern to allow accumulated sewage to pass into the associated vacuum pipe network for transport to the remote collection station. Installation of the unit controller has been on the upper housing of the inlet vacuum valve and has presented somewhat of a problem during an original installation, due to the tight quarters one must work in.

Occasionally, due to storms allowing water to enter fittings which are recently damaged and unexpected power failures, the unit controllers of an inlet vacuum valve fail to perform or do not perform in accordance with a predetermined pattern, and require field replacement by field service engineers or trained maintenance personnel. Unit controllers are often fastened to the upper housing of the inlet vacuum valve by a mounting arrangement which involves threading a plurality of stainless steel bolts into threaded stainless steel inserts found in the upper housing of the inlet vacuum valve. Often the field service personnel will have to conduct their service operations in a very unpleasant environment, due to weather conditions, or due to the cramped nature of the area where the inlet vacuum valves and unit controllers are located. Occasionally, the stainless steel inserts in the upper housing are misaligned when the original inlet vacuum valve has been originally manufactured and this misalignment causes problems for the field service personnel to make the proper physical connection required when replacing a unit controller that has failed.

Similarly, due to location of the unit controller on the top of the upper housing of the inlet vacuum valve, some of the threaded connections which have to be accomplished at the rear of the unit controller require a connection which cannot be viewed by the field service personnel. All of this is very time consuming for field service personnel who find themselves in a dirty, damp, smelly and cramped below grade environment where the inlet vacuum valve and unit controller are located.

Furthermore, as a result of the constant dampness and moisture condensation present, the stainless steel bolts and stainless steel inserts which hold the unit controller to the inlet vacuum valve will tend to become coated or oxidize over time or over the life cycle of the inlet vacuum valve due to ground water within the below grade chamber. This presents additional connection problems for the field service personnel to overcome.

OBJECTS OF THE PRESENT INVENTION

Accordingly, it is a primary object of the present invention to provide an improved mounting apparatus to mount the unit controller to the inlet vacuum valve of a vacuum sewerage system which will overcome the deficiencies of the various mounting arrangements associated with the prior design and construction.

Another object of the present invention is to provide an improved mounting means for a unit controller for an inlet vacuum valve of a vacuum sewerage system which will facilitate the mounting or release of the unit controller from the upper housing of the inlet vacuum valve in an expedient manner.

It is another object of the present invention to provide a mounting means for a unit controller for an inlet vacuum valve of a vacuum sewerage system which will have improved durability over the prior art and yet be of a relatively simple design and construction to eliminate the requirement of periodic maintenance by field service personnel.

SUMMARY OF THE INVENTION

In practicing the invention, a quick release mounting apparatus to mount a unit controller to an inlet vacuum valve for a vacuum sewerage system is provided having a quick-release mounting key structural member which is slidably fitted to shoulder members of a stationary base member to secure the mounting feet of the associated control unit for the inlet vacuum valve. The stationary base member is permanently secured to the upper housing of the inlet vacuum valve. The quick-release mounting key has a plurality of keyed cutouts which facilitate proper alignment with respective shoulder members of which the stationary base member to the mounting feet of the control unit are positioned for securing to the stationary base member. The mounting key has a plurality of tapered, elongated tines, for purposes of effecting a tight press-fit. One end of the quick release mounting key has a portion adjacent a slot-like opening for purposes of gripping the quick-release mounting key during its insertion or removal.

An alternative embodiment of the present invention provides for one of the elongated tines of the quick release mounting key member to be longer than its parallel tine, the longer tine having a hook-shaped end portion which resiliently secures itself to the end of the respective shoulder member.

BRIEF DESCRIPTION OF THE DRAWINGS

FIG. 3 is a partial perspective view of a control unit assembly and the upper housing of an inlet vacuum valve utilizing a quick-release mounting apparatus of the present invention to secure the control unit to the upper housing of the inlet vacuum valve.

FIG. 4 is an exploded view of the control unit assembly and the upper housing of an inlet vacuum valve with the quick-release mounting apparatus of the present invention illustrating how the control unit is physically connected to the upper housing of the inlet vacuum valve.

FIG. 5 is an exploded view illustrating an alternative embodiment of the quick-release mounting apparatus of the present invention to secure the control unit to the upper housing of the inlet vacuum valve.

FIG. 6 is a top view of the quick-release mounting key illustrating the keyed openings and elongated tine of the alternative embodiment of the quick-release mounting key.

FIG. 7 is a side elevational view of the quick-release mounting key illustrating the hook-shaped end portion which extends beyond its parallel tine of the alternative embodiment of the quick-release mounting key.

FIG. 8 is an enlarged partial cross-section of the quick-release mounting apparatus of the present invention taken along lines 8—8 of FIG. 4.

FIG. 9 is an enlarged partial cross-section of the alternative embodiment of the quick-release mounting apparatus of the present invention wherein the alternative embodiment for the mounting key is utilized.

DETAILED DESCRIPTION OF THE PREFERRED EMBODIMENT

Figure 1:
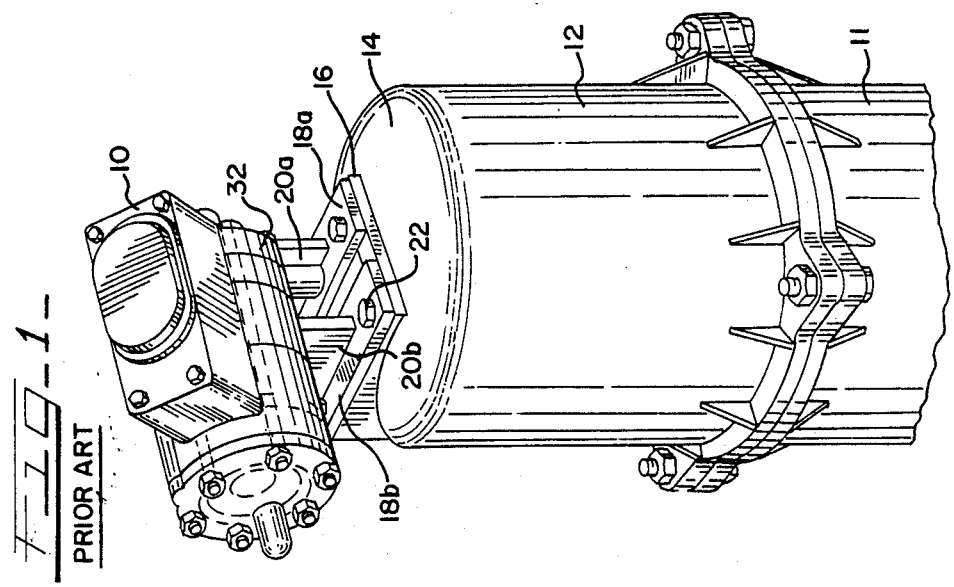
FIG. 1 is a partial perspective view of a control unit assembly attached to the upper housing of an inlet vacuum valve for a vacuum sewerage system of the prior art design and construction.

The quick-release mounting apparatus of the present invention to mount a unit controller to an inlet vacuum valve for a vacuum sewerage system may be best understood by reference to the drawings. FIG. 1 is a partial perspective view of unit controller assembly 10 physically mounted to the upper housing 12 of an inlet vacuum valve 11, only the complete upper housing 12 being illustrated. On the top surface 14 of the upper housing 12 of the inlet vacuum valve 11, there is a stationary mounting base 16. The mounting base 16 is molded to the top surface 14 of the upper housing 12. The unit controller assembly 10 has respective mounting feet 18a and 18b which are secured to the mounting base 16 by bolts 22. The mounting feet are made of a nylon based material. The unit controller assembly 10 has lower shoulder portions 20a and 20b integrally connected to respective mounting feet 18a and 18b, which are molded as an integral part of the unit controller assembly housing 32. A plurality of stainless steel bolts 22 secure the mounting feet 18a and 18b to the mounting base 16.

Figure 2:
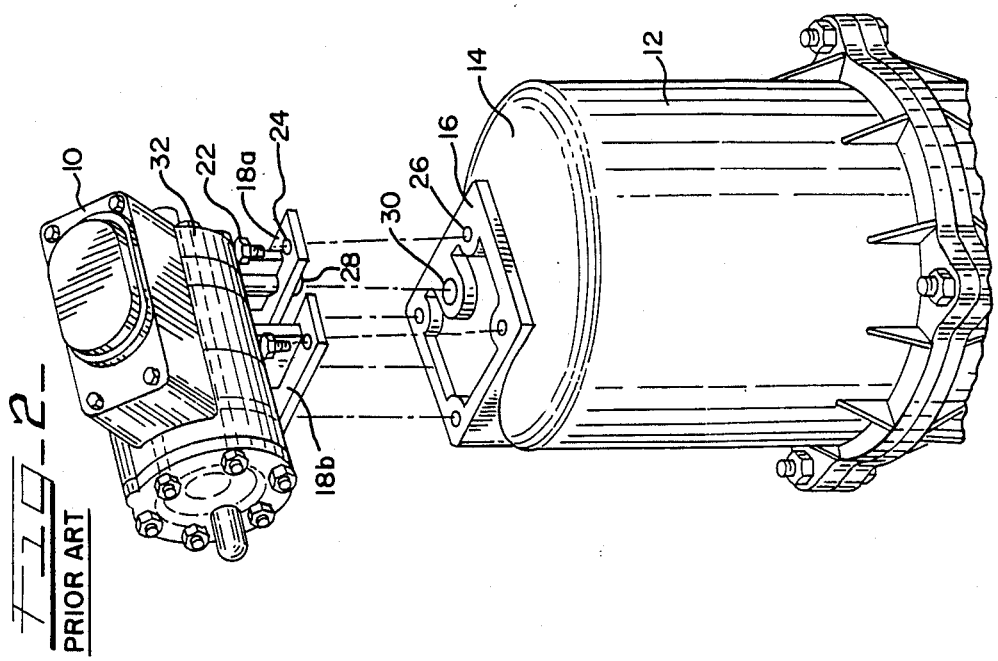
FIG. 2 is an exploded view of the control unit assembly and the upper housing of an inlet vacuum valve showing how the control unit is physically connected to the upper housing of inlet vacuum valve.

FIG. 2 is an exploded view of the mounting arrangement associated with mounting the unit controller assembly 10 to the upper housing 12 of an inlet vacuum valve 11. Steel bolts 22 fit through respective holes or apertures 24, found at predetermined locations at each end of the mounting feet 18a and 18b. The stainless steel bolts 22 thread into respective stainless steel inserts 26 positioned in the mounting base 16. A protruding locating pin 28 serves to align the unit controller assembly 10 into proper alignment with the mounting base 16 as the locating pin 28 fits into respective aperture 30. The bolts 22 are tightened to a predetermined torque.

FIG. 3 is a partial perspective view of a control unit assembly and the upper housing of an inlet vacuum valve utilizing the quick-release mounting apparatus of the present invention. FIG. 4 is an exploded view of the control unit assembly and the upper housing of an inlet vacuum valve with the quick-release mounting apparatus of the present invention. Referring now to FIGS. 3 and 4, the unit controller assembly 10 is secured to a mounting base 40, having shoulder portions 48a and 48b. The mounting base 40 is heat-staked to the top surface 14 of the upper housing 12. Shoulder portions 48a and 48b form respective captivated shoulder slots 54a and 54b extending the entire length of each shoulder portion 48. Mounting feet 18a and 18b of the unit controller 10 are positioned on top of mounting base 40, with the assistance of the locating pin 28 and associated aperture 30. The mounting feet 18a and 18b are manufactured from a nylon based material. Following the positioning of the unit controller assembly 10 on the mounting base 40, a quick release mounting key 42, having a handle 44 at one end and respective tapered elongated tines portion 46a and 46b, is inserted into the shoulder slots 58a and 54b contained in respective shoulder portions 48a of 48b of the mounting base 40.

The quick-release mounting key 42 is slid over the mounting feet 18a and 18b respectively of the unit controller 10, and around shoulder members 20a and 20b by the use of a keyed aperture 50, in conjunction with a longitudinal slot-like opening 52. Spacer portion 58 fits between shoulder portions 20a and 20b to provide protection against lateral movement of the unit controller 10. Since the ends of each of the elongated tines 46a and 46b are tapered, the mounting key 42 is able to be positioned to enable a tight press-fit connection on top of the mounting feet 18a and 18b to secure the unit controller 10 to the mounting base 40 within respective shoulder slots 54a and 54b. The mounting key 42 has a handle at one end 44 and a centrally disposed slot-like aperture 56 to position the fingers in order to more firmly grip the handle 44.

FIG. 5 is an exploded view of the quick-release mounting apparatus of the present invention illustrating an alternative embodiment relative to the quick-release mounting key 62 which is utilized to operationally secure the mounting feet 18a and 18b of the unit controller 10 to the mounting base 40. This alternative design for mounting key 62 has respective elongated tines portions 64a and 64b, each tine being tapered to form an end. One of the tines 64a is longer than its opposite tine 64b. This is because at the end of the longer tine 64a there is a hook-shaped fastener 66 protruding, which has an integral stop-shoulder portion 68. This integral stop-shoulder portion 68 fits over the end of base shoulder member 48 (best seen in FIG. 9) after the mounting key is secured within respective shoulder slots 54a and 54b. This will operationally secure the mounting key 62 to the mounting base 40 after a tight press-fit is obtained. In order to disengage the mounting key 62, the hook-shaped end fastener 66, which has a rounded top surface 70, is simply deflected in a downward manner, and the mounting key 62 can then be pulled from the respective shoulder slots 54a and 54b.

FIG. 6 is a top view of the alternative embodiment for the quick-release mounting key 62, illustrating the keyed apertures and longer tine portion 64a, when compared to its opposite tine 64b. Mounting key 62 has a handle portion 44 and a centrally disposed opening 56 for placement of the fingers to better grip the mounting key 62. A central spacer portion 58 defines the slot-like opening 52 and the keyed aperture 50. At the end of the tine 64a there is a hook-shaped end fastener 66.

Referring now to FIG. 7, which is a side view of the quick-release mounting key 62, the hook-shaped end fastener 66, has an integral stop shoulder portion 68, and a rounded surface 70. The hook-shaped end fastener 66, may be deflected in a downward manner in order to release and free the mounting key 62, after which a mounting key 62 can be pulled from the shoulder slots 54a and 54b.

FIG. 8 is an enlarged partial cross-section of the quick-release mounting apparatus of the present invention along lines 8—8 of FIG. 4, utilizing the first embodiment for quick-release mounting key 42. It is important to note that the mounting key 42 is precisely tapered so as to secure a tight press-fit in the shoulder slots 54a and 54b. The length of the mounting key 42 may extend beyond the end of shoulder member 48, or mounting foot 18; although the mounting-key 42 can be designed so as not to extend beyond the associated structural members, as shown in FIG. 8.

FIG. 9 is an enlarged partial cross-section along lines 8—8 of FIG. 4 wherein the alternative embodiment for the mounting key 62 has been substituted for the previous mounting key 42. Note that the tapered mounting key 62 has one particular tine which is longer than the other and which has a hook-shaped fastener 66 at its end. The hook-shaped fastener has a rounded top surface 70 and an integral stop-shoulder portion 68, which allows the end 66 to snap-fit over the base shoulder member 48. The mounting key 66 may be disengaged by deflecting the end 66 in a downward fashion and then pulling the mounting key 62 by its handle 44 to free it from the shoulder slots 54a and 54b of the base member 40.

From the foregoing, it will be seen that this invention is one well adapted to retain all of the ends and objects hereinabove set forth, together with the other advantages which are inherent to the invention. Since many possible embodiments may be made of the invention without departing from the scope thereof, it is understood that all matters herein set forth or shown in the accompanying drawings is to be interpreted as illustrative and not in a limiting sense. It is understood that certain features and subcombinations are of utility and may be employed without reference to other features in said subcombinations; this is contemplated by and is within the scope of the claims.

While the preferred embodiment has been described, variations thereto will occur to those skilled in the art within the scope of the present inventive concept which are delineated by the following claims.

What is claimed is:

1. Mounting apparatus for mounting a unit controller assembly to an inlet vacuum valve of a vacuum sewerage system, said unit controller assembly having an exterior housing, said inlet vacuum valve having a lower housing and an upper housing opposite the lower housing, said upper housing having a top surface, said mounting apparatus comprising in combination:
 a substantially wedge-shaped member of a predetermined size;
 a base support secured to the top surface of said upper housing, said base support having means for slidably receiving said wedge-shaped member; and
 a pair of substantially rectangular-shaped mounting supports integrally mounted to a pair of support members extending from said housing of said unit controller,
whereby said mounting supports are positioned on top of the base member and said wedge-shaped member is slid into said means for slidably receiving said wedge-shaped member on top of the mounting supports thereby securing said mounting supports to the base support with a press-fit compression connection.

2. The mounting apparatus of claim 1 wherein said wedge-shaped member has a plurality of tapered elongated portions of substantially the same length extending along each side of said wedge-shaped member, and a spacer portion centrally disposed between said elongated portions which define a pair of slot-like apertures which are adapted to receive said leg support members within a respective aperture.

3. Quick-release mounting apparatus for mounting a unit controller assembly for an inlet vacuum valve of a vacuum sewerage system, said unit controller assembly having an exterior housing, said inlet vacuum valve having a lower housing and an upper housing opposite the lower housing, said upper housing having a top surface, said mounting apparatus comprising in combination:
 a substantially wedge-shaped member of a predetermined size, said wedge-shaped member having a handle at one end;
 a base support secured to the top surface of said upper housing, said base support having a pair of substantially parallel shoulder portions extending away from the top surface of the upper housing, said shoulder portions containing slot-like groves of a predetermined width extending along each shoulder portion thereof, said slot-like groves are adapted to receive said wedge-shaped member; and
 a pair of substantially rectangular-shaped mounting supports integrally mounted to a pair of support members extending from said exterior housing of said unit controller,
whereby said mounting supports are positioned on top of the base member and said wedge-shaped member is slid into said slot-like groves on top of the mounting supports thereby securing said mounting supports to the base support with a press-fit compression connection.

4. The quick-release mounting apparatus of claim 3 wherein said wedge-shaped member has a plurality of tapered elongated portions of substantially the same length extending along each side of said wedge-shaped member, and a spacer portion centrally disposed between said elongated portions which define a pair of slot-like apertures which are adapted to receive said leg support members within a respective aperture.

5. Mounting apparatus for mounting a unit controller assembly to an inlet vacuum valve of a vacuum sewerage system, said unit controller assembly having an exterior housing, said inlet vacuum valve having a lower housing and an upper housing opposite the lower housing, said upper housing having a top surface, said mounting apparatus comprising in combination:
 a substantially wedge-shaped member of a predetermined size, said wedge-shaped member having a pair of tapered elongated portions, one of the pair being longer than the other, the longer one of the pair having an end that is substantially shaped like a hook;

a base support secured to the top surface of said upper housing, said base support having means for slidably receiving said wedge-shaped member; and a pair of substantially rectangular-shaped mounting supports integrally mounted to a pair of support members extending from said exterior housing of said unit controller, whereby said mounting supports are positioned on top of the base member and said wedge-shaped member is slid into said means for slidably receiving said wedge-shaped member on top of the mounting supports thereby securing said mounting supports to the base support with a press-fit compression connection.

6. The mounting apparatus of claim 5 wherein said wedge-shaped member has a plurality of tapered elongated portions extending along each side of said wedge-shaped member, and a spacer portion centrally disposed between said elongated portions which define a pair of slot-like apertures which are adapted to receive said leg support members within a respective aperture.

7. Quick-release mounting apparatus for mounting a unit controller assembly for an inlet vacuum valve of a vacuum sewerage system, said unit controller assembly having an exterior housing, said inlet vacuum valve having a lower housing and an upper housing opposite the lower housing, said upper housing having a top surface, said mounting apparatus comprising in combination:

a substantially wedge-shaped member of a predetermined size, said wedge-shaped member having a handle at one end, said wedge-shaped member having a pair of tapered elongated portions, one of the pair being longer than the other, said longer one of the pair having an end that is substantially shaped like a hook;

a base support secured to the top surface of said upper housing, said base support having a pair of substantially parallel shoulder portions extending away from the top surface of the upper housing, said shoulder portions containing slot-like groves of a predetermined width extending along each shoulder portion thereof, said slot-like groves are adapted to receive said wedge-shaped member; and a pair of substantially rectangular-shaped mounting supports integrally mounted to said exterior housing of said unit controller, whereby said mounting supports are positioned on top of the base member and said wedge-shaped member is slid into said slot-like groves on top of the mounting supports thereby securing said mounting supports to the base support with a press-fit compression connection.

8. The quick-release mounting apparatus of claim 7 wherein said wedge-shaped member has a plurality of tapered elongated portions of substantially the same length extending along each side of said wedge-saped member, and a spacer portion centrally disposed between said elongated portions which define a pair of slot-like apertures which are adapted to receive said leg support members within a respective aperture.

* * * * *